Patented Nov. 13, 1951

2,575,265

UNITED STATES PATENT OFFICE 2,575,265

ADHESIVE COMPOSITION AND METHOD OF MAKING

Leon F. Fiedler, Cuyahoga Falls, and Paul J. Leakey, Kent, Ohio, assignors to The B. F. Goodrich Company, New York, N. Y., a corporation of New York No Drawing. Application December 17, 1949, Serial No. 133,692

9 Claims. (Cl. 260—38)

1

This invention relates to an adhesive composition and method of making the same and pertains more specifically to an improved composition comprising a rubbery butadiene-acrylonitrile copolymer and a phenol-aldehyde resin.

One object of this invention is to provide an improved composition which can be more readily sheeted out on conventional rubber working machinery. Another object is to provide a method of making an adhesive composition in sheet or tape form with close control over the thickness of the sheet or tape. Another object is to facilitate the mixing and blending of a rubbery butadiene-acrylonitrile polymer and a phenol-aldehyde resin to form an adhesive composition. Other objects will be apparent from the description which follows.

It has been proposed to employ blends of rubbery butadiene-acrylonitrile copolymers with phenol-aldehyde resins as adhesives, particularly for adhering together inflexible articles such as those made of metal, glass, structural materials, asbestos brake linings and metal brake shoes, and the like. In practice, a sheet of the adhesive composition of the desired size and shape is disposed between the surfaces to be adhered; sufficient heat and pressure are then applied to vulcanize the rubbery copolymer and cure the resin, resulting in an adhesive bond of great strength.

In order to obtain optimum bonding strength, it is essential that the surfaces of the adhesive composition sheet be smooth and free from pits or other irregularities. Furthermore, in utilizing such adhesive composition sheets in the mass production of bonded articles, it is essential that the gauge of the sheet be uniform within close tolerances so that the jigs and presses employed can be used without the necessity for frequent readjustments. In the past it has proven difficult to provide such an adhesive composition in the form of sheets or tapes having the desired characteristics.

We have now discovered that the introduction of a small amount of particulate aluminum metal, preferably aluminum flake, into the composition makes it possible to achieve the desired results with conventional rubber-working machinery, such as roll mills and calenders. The particle size of the aluminum powder is not critical and may vary from 1.0 to 200 microns. Preferably the particles are in the form of flakes which may be 2–5 microns thick with an average diameter of 25–30 microns.

The aluminum flake is preferably mixed into the rubbery copolymer composition before the phenol-aldehyde resin is added. The amount used may vary over a rather wide range, from about 2 to 25 parts by weight or more for each 100 parts by weight of the copolymers; preferably from 5 to 20 parts by weight per 100 parts of copolymer are employed.

2

There may be used in the composition of this invention any rubbery copolymer of an open-chain conjugated diolefin containing from four to eight carbon atoms with acrylonitrile; rubbery copolymers of butadiene-1,3 and acrylonitrile are preferred, such as the 55:45 copolymer or the 67:33 copolymer or the 75:25 copolymer or similar rubbery copolymers. Any of the usual compounding ingredients may also be present, such as pigments, fillers, vulcanizing agents, accelerators, antioxidants, and the like.

The phenol-aldehyde resins employed should be thermosetting, i. e., capable of hardening or curing when subjected to heat. They may be either one-stage or two-stage resins; in the latter case, of course, a curing agent such as hexamethylene tetramine or the like is required to bring about thermosetting of the resin when heated. The resins may be made by reacting any of the phenols with any of the aldehydes, preferably aliphatic aldehydes, in various proportions, as is well known to the art. The most commonly used phenols include phenol, cresol, xylenol, and resorcinol, while the aldehydes include formaldehyde, acetaldehyde, and butyraldehyde. The resins also may be modified by the inclusion of drying oils, rosin, or similar modifiers. Some of the trade names under which phenol-aldehyde resins are sold include "Amberlite," "Bakelite," "Catalin," "Durez," "Indur," "Makalot," "Resinox," and "Textolite."

The relative proportions in which the rubbery copolymer and the resin are present in the mixture may vary over a rather wide range, the weight of the resin being from 20% to 300% of the weight of the copolymer, preferably from 100% to 200% by weight. Mixtures of two or more different phenol-aldehyde resins may be employed provided that the total weight of resin is within the limits set forth above.

A specific example of the invention will be described by way of illustration, but it will be understood that the example is not intended to limit the scope of the invention as defined in the appended claims.

Example

An adhesive composition having the following recipe was prepared:

| | Parts by weight |
|---|---|
| Rubbery butadiene-1,3-acrylonitrile copolymer (55:45) | 100.0 |
| Zinc oxide | 5.0 |
| Sulfur | 1.0 |
| 2-Mercaptobenzothiazole | 1.0 |
| Aluminum flake | 20.0 |
| Phenol formaldehyde resin (Durez) | 150.0 |
| Hexamethylene tetramine | 12.0 |
| Total | 289.0 |

The zinc oxide, sulfur, and 2-mercaptobenzothiazole were added to the rubbery copolymer on a roll mill at about 180° F. The aluminum flake was then dispersed in the composition, followed by the resin. The hexamethylene tetramine may be added either along with the resin or subsequently. The composition milled smoothly and evenly and could be sheeted out very readily.

The milled composition was then calendered into a sheet of 0.008" thickness on a conventional calender. The resulting sheet had an extremely uniform gauge and a very smooth surface free from blemishes and undulations, was flexible, rubbery, and non-tacky and could be stored for an extended period of time before use without deterioration or loss of bonding strength.

When the aluminum flake is omitted from the composition, on the other hand, and the composition is otherwise processed in the same way, it is exceedingly difficult to obtain a smooth sheet, even with prolonged mill mixing and exceptionally careful control of the calender.

Similar results are obtained using 5, 10, 15, or 25 parts of aluminum flake for each 100 parts of rubber.

The composition so produced may be used to bond together, for example, a sheet of glass and a steel plate by inserting a sheet of the composition of suitable shape between the two members to be bonded and heating the assembly for 15 minutes at 400° F. under 200 p. s. i. pressure. The resulting bonded assembly has a shear strength in excess of 4000 p. s. i.

The conditions of temperature and pressure required to develop the full strength of the adhesive bond may be varied rather widely, but best results are obtained at temperatures of 250° to 500° F. and pressures of 100 to 300 p. s. i. The time required for this step may vary from 5 minutes or even less at the higher temperatures and pressures to 30 or even 45 minutes at lower temperatures.

Although we have described specific embodiments of our invention we do not intend to limit ourselves solely thereto but to include all of the obvious variations and modifications within the scope of the appended claims.

We claim:

1. An adhesive composition comprising a mixture of 100 parts by weight of a vulcanizable rubbery copolymer of acrylonitrile with an open-chain conjugated diolefin, a vulcanizing agent therefor, from 2 to 25 parts by weight of particulate aluminum metal, and from 20 to 300 parts by weight of a thermosetting phenol-aldehyde resin.

2. An adhesive composition comprising a mixture of 100 parts by weight of a vulcanizable rubbery copolymer of acrylonitrile with butadiene-1,3, a vulcanizing agent therefor, from 2 to 25 parts by weight of aluminum powder, and from 100 to 200 parts by weight of a thermosetting phenol-aldehyde resin.

3. An adhesive composition comprising a mixture of 100 parts by weight of a vulcanizable rubbery copolymer of acrylonitrile and butadiene-1,3, a vulcanizing agent therefor, from 5 to 20 parts by weight of aluminum flake, and from 100 to 200 parts by weight of a thermosetting phenol-formaldehyde resin.

4. An adhesive sheet comprising the composition of claim 3.

5. The method of making an adhesive composition which method comprises mixing from 2 to 25 parts by weight of particulate aluminum metal with 100 parts by weight of a vulcanizable rubbery copolymer of acrylonitrile with an open-chain conjugated diolefin and with a vulcanizing agent therefor, and thereafter mixing into said composition from 20 to 300 parts by weight of a thermosetting phenol-aldehyde resin.

6. The method of making an adhesive composition which method comprises mixing from 2 to 25 parts by weight of aluminum powder with 100 parts by weight of a vulcanizable rubbery copolymer of acrylonitrile with butadiene-1,3 and with a vulcanizing agent therefor, and thereafter mixing into said composition from 100 to 200 parts by weight of a thermosetting phenol-aldehyde resin.

7. The method of making an adhesive composition which method comprises mixing from 2 to 25 parts by weight of aluminum powder with 100 parts by weight of a vulcanizable rubbery copolymer of acrylonitrile and butadiene-1,3 and with a vulcanizing agent therefor, and thereafter mixing into said composition from 100 to 200 parts by weight of a thermosetting phenol-aldehyde resin, and calendering said composition into a sheet of uniform thickness.

8. The method of making an adhesive composition which method comprises mixing from 5 to 20 parts by weight of aluminum flake with 100 parts by weight of a vulcanizable rubbery copolymer of acrylonitrile and butadiene-1,3 and with a vulcanizing agent therefor, and thereafter mixing into said composition from 100 to 200 parts by weight of a thermosetting phenol-formaldehyde resin.

9. The method of making an adhesive composition which method comprises mixing from 5 to 20 parts by weight of aluminum flake with 100 parts by weight of a vulcanizable rubbery copolymer of acrylonitrile and butadiene-1,3 and with a vulcanizing agent therefor, and thereafter mixing into said composition from 100 to 200 parts by weight of a thermosetting phenol-formaldehyde resin, and calendering said composition into a sheet of uniform thickness.

LEON F. FIEDLER.
PAUL J. LEAKEY.

REFERENCES CITED

The following references are of record in the file of this patent:

UNITED STATES PATENTS

| Number | Name | Date |
| --- | --- | --- |
| 2,376,854 | Saunders | May 22, 1945 |
| 2,473,319 | Winkelmann | June 14, 1949 |